United States Patent

Arnett et al.

[19]

[11] 3,722,686
[45] Mar. 27, 1973

[54] POND FILTER
[75] Inventors: Wayne E. Arnett, Hettick; Cyril P. Solomon, Palmyra, both of Ill.
[73] Assignee: Solarn Mfg. Co., Inc., Hettick, Ill.
[22] Filed: Mar. 17, 1971
[21] Appl. No.: 125,101

[52] U.S. Cl. ............210/170, 210/242, 210/314, 210/460, 210/494
[51] Int. Cl. .............................................B01d 35/02
[58] Field of Search......210/314, 316, 460, 462, 463, 210/169, 170, 206, 494, 242

[56] References Cited

UNITED STATES PATENTS

| | | | |
|---|---|---|---|
| 3,120,491 | 2/1964 | Kincaid | 210/463 X |
| 3,313,421 | 4/1967 | Falkenberg et al. | 210/314 |
| 2,371,895 | 3/1945 | Kingman | 210/457 |
| 3,401,116 | 9/1968 | Stanwood | 210/62 |
| 2,837,032 | 6/1958 | Horsting, Sr. | 210/460 X |

Primary Examiner—Frank A. Spear, Jr.
Attorney—Ralph W. Kalish

[57] ABSTRACT

A pond filter comprising a cylindrical casing having a coarse filter in communication with the surrounding fluid through openings in the side wall of said casing, a secondary or fine filter disposed adjacent said coarse filter and a relatively increased fine filter presented down-stream of said fine filter; there being pump means connected to said filter through an intervening collecting receptacle. One form of the present invention contemplates the incorporation of a volume of buoyant material within the casing upwardly of the coarse filter, while another embodiment obviates the provision of buoyant material through fixing the filter within the fluid body by rigid supports.

8 Claims, 5 Drawing Figures

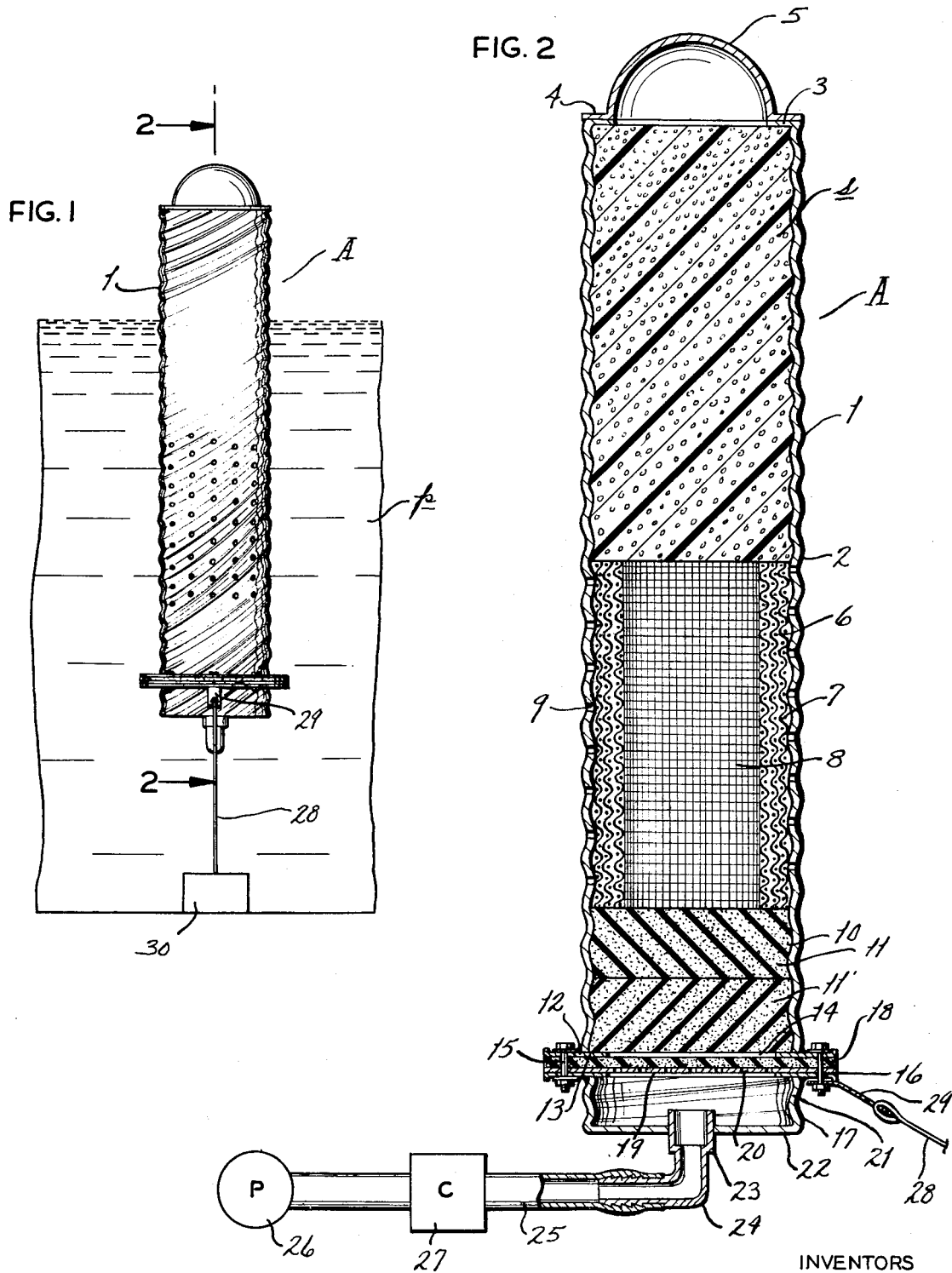

POND FILTER

BACKGROUND AND SUMMARY OF THE INVENTION

The present invention relates in general to filters, and, more particularly, to a filter of the so-called pond type being adapted for immersion within a body of water.

It is an object of the present invention to provide a filter of the type stated which is adapted to remove relatively coarse as well as relatively fine foreign agents and impurities from a liquid body for rendering same clear and suitable for either direct animal consumption or for further treatment, as by chlorinating, for human consumption.

It is another object of the present invention to provide a filter of the type stated which is constructed of lightweight, rustproof, durable materials which conduce to longevity in usage and facility in handling.

It is another object of the present invention to provide a filter of the so-called pond type which incorporates a plurality of filters of graduated character which may be easily and economically replaced.

It is a still further object of the present invention to provide a filter of the character stated which is of buoyant character so as to be maintainable in a floating state; there being means preventing undesired displacement.

It is another object of the present invention to provide a filter of the type stated which may be most economically produced; which may be installed and used without the exercise of skilled personnel; which may be coordinated with a conventional chlorinator so as to render the filtered liquid chemically pure.

BRIEF DESCRIPTION OF THE DRAWINGS

FIG. 1 is an elevational view of a pond filter constructed in accordance with and embodying the present invention, illustrating the filter in operative position.

FIG. 2 is a vertical transverse sectional view taken on the line 2—2 of FIG. 1.

DESCRIPTION OF PRACTICAL EMBODIMENTS

Figure 3:
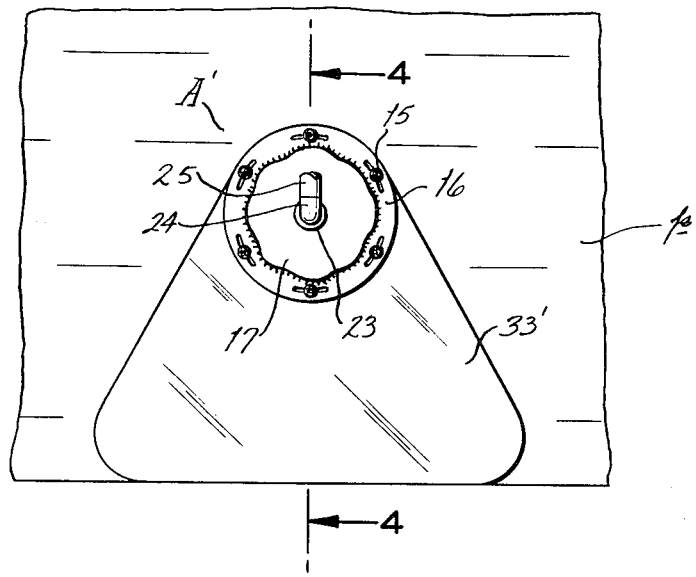
FIG. 3 is an end view of another form of filter constructed in accordance with and embodying the present invention.

Referring now by reference characters to the drawings which illustrate practical embodiments of the present invention, A generally designates a filter of the so-called pond type being adapted for disposition within a body of water such as a pond $p$ as located in general farm country. Filter A comprises a generally cylindrical casing 1 which is constructed of suitable lightweight material such as, preferably, aluminum and being desirably of corrugated contour, as indicated at 2, for conducing to structural strength. At its upper end, casing 1 is turned inwardly to define an annular flange 3 upon which is suitably secured the peripheral flange 4 of a generally hemispherical dome 5, fabricated from a suitable reflective material, and which encloses the upper end of casing 1. Provided within the interior of casing 1, in its upper portion, is a volume of porous exceedingly lightweight material $s$ such as an expanded, cellular polystyrene; the same being packed within casing 1 for conforming to the interior thereof and with the upper end of such volume abutting against the underface of flange 3. The quantity of such material $s$ will depend upon the overall dimensions and weight of filter A so as to accord same the desired degree of buoyancy. The volume of material $s$ provided within filter A herein illustrated is shown, for purposes of example only, as being slightly less than one-half the total interior volume of casing 1. Said material $s$ rests upon a coarse filter element 6 which may be comprised of a single length of wire mesh 7, as used for developing window screens and the like, which element 6 is wound upon itself in roll form to present a peripheral multilayer arrangement immediately proximate the side wall of casing 1. Centrally, element 6 is provided with a bore or passage 8 coaxial with casing 1. Element 6 is of sufficient flexibility so that the outer portions thereof will tightly abut against the inner face of casing 1 in order that liquid entering said casing 1 through ports 9 formed in the portion surrounding element 6 must flow through element 6 as opposed to bypassing same by undesired flow downwardly of the casing wall. It will be observed that ports 9 are provided only in that portion of casing 1 which surrounds element 6 and that the same are arranged in a relatively random pattern in order to provide ease of ingress of the ambient fluid. The layered effect of element 6 assures that incoming fluid must flow through relatively sinuous paths before reaching passage 8 whereby solid particulates within the fluid will be obstructed by the mesh so that fluid moving into passage 8 will be substantially free of the larger forms of foreign matter. Thus, element 6 constitutes an initial filtering body for removing coarse impurities. It is, of course, to be observed that the number of layers of filter element 6 may be preselected depending upon the quantities of particulates normally encountered within the surrounding liquid body.

Filter element 6 at its lower end is supported upon a secondary, relatively fine filter element 10 constituted of a block 11, or a multiplicity of such blocks 11, of porous or spongeous material, such as synthetic sponge and the like for impermeability to less than coarse solids entrained in the fluid. As shown in FIG. 2 said filter element 10 may be comprised of a pair of such blocks as indicated at 11,11' one disposed above the other; which blocks merely exemplify a multilayered filter element 10. Said secondary filter 10 constitutes a relatively reduced volume as compared to filter 6 and provides a base for passage 8 so that liquid flowing downwardly therefrom must, through gravity, flow into filter element 10. Said filter element 10 thus fills the lower end of casing 1 which latter is provided with an outturned marginal flange 12 and with a short inwardly turned flange 13 for providing a support for filter elements 10 and 6 and buoyant material $s$ with the inner edge of said flange 13 defining an enlarged annular opening 14.

Flange 12 is secured as by bolts 15 presented spacedly about its periphery to the planarwise parallel upper marginal flange 16 projecting from the upper wall of a collecting receptacle 17. Maintained in its marginal portions between flanges 12, 16 is a compressible auxiliary filter element 18 normally of block like form but being substantially reduced in thickness by requisite tightening of bolts 15 to form a filter of increased fineness. Thus, filter element 18 extends across opening 14 and with its undersurface resting upon the top plate 19 of receptacle 17; said plate 19 being provided with a multiplicity of relatively small perforations 20 for flow therethrough of the filtered fluid into receptacle 17 which latter comprises a side wall 21 of like configuration as casing 1 and a flat bottom wall 22 planar parallel to top wall 19. Located centrally of bottom wall 22 is a cup-like fitting 23 having an open, upper end which is disposed above the plane of bottom wall 22. The lower end of fitting 23 is integral with one end of an elbow joint 24; the other end being threadedly engaged to one end of a pipe 25 which, in turn, is in communication with a conventional pump 26. Pump 26 is located at a point remote from the body of water such as pond p and may preferably be of the type adapted for pumping at a rate of 120 gallons per hour. If desired, there may be located within pipe 25, anterior to pump 26, a chlorinator 27 as utilized for purifying pond water for human consumption.

In order to maintain filter A in desired position within the particular body of water and hence resistant to displacement, a stabilizing cable 28 engaging filter A as by lug 29, may be used for effecting securement to a suitable anchor 30 such as a concrete block or the like disposed upon the bed of the pond. Thus, cable 28 in addition to maintaining filter A in position serves also to prevent a costly rupturing of the connection between filter A and pump 26.

By reason of the slight projection of the upper end of fitting 23 above bottom wall 22 of receptacle 17 the portion of said receptacle 17 immediately surrounding fitting 23 serves as a sediment basin whereby any solid matter which was not filtered from the fluid reaching receptacle 17 will tend to settle upon bottom wall 22 for effective removal so that fluid flowing through fitting 23 will be free thereof.

The reflective quality of dome 5 prevents filter A from becoming a navigational hazard, rendering the same visible at a sufficient distance to permit requisite evasive action.

In operation, with filter A disposed within a pond p or the like the same will be substantially immersed so that the dome 5 and the adjacent upper portion of casing 1 will now only be visible (see FIG. 1); dependent, however, upon the buoyancy characteristics of filter A. It has been found through experience that the level of fluid within a pond or like exterior body of water which is most desirable for maximum effective pumping action is in the range of approximately 12 to 18 inches below the fluid surface, such zone being colloquially referred to as "prime reservoir area" since in this particular zone the fluid is free of the normal floating material encountered thereabove as well as of the relatively heavy sediment found therebelow. Consequently, the arrangement of filters and the floating capability of filter A is fundamentally dictated by the desire for filter A to accept the fluid from this aforesaid stratum. However, fluid at the 18 inch or slightly below level will be available on a year around basis since the freezing line in most areas may reach into the range of 10 to 14 inches below the surface. Consequently, the freezing line for a particular climate will also be a factor to be taken into consideration in arranging the components of filter A.

Thus, with pump 26 in operation fluid is drawn from the ambient body through ports 9 for coarse filtering by filter element 6 and then flow downwardly through relatively fine filter element 10. From the latter the fluid will be further filtered by the enhancedly fine filter element 18 and then discharged into receptacle 17 for further sediment deposition. From receptacle 17 the relatively clear fluid is thus drawn through the suction side of pump 26 for discharge for the intended purposes. Customarily, fluid treated by filter A, without benefit of chlorinator 27 will be sufficiently purified for animal consumption but chemically unsuitable for human consumption. The operation of chlorinator 27 will sufficiently chemically cleanse the fluid so that the same will be suitable for human consumption.

Filter A is accordingly particularly adapted for farm usage being extremely durable as the same is constituted of a minimum of simply constructed components with the same providing a positive water source for livestock usage as well as for further treatment for household use. Additionally, by reason of the volume of material $s$ filter A is resistant to sinking even were the adjacent portions of casing 1 to be perforated through accident or otherwise.

Figure 4:
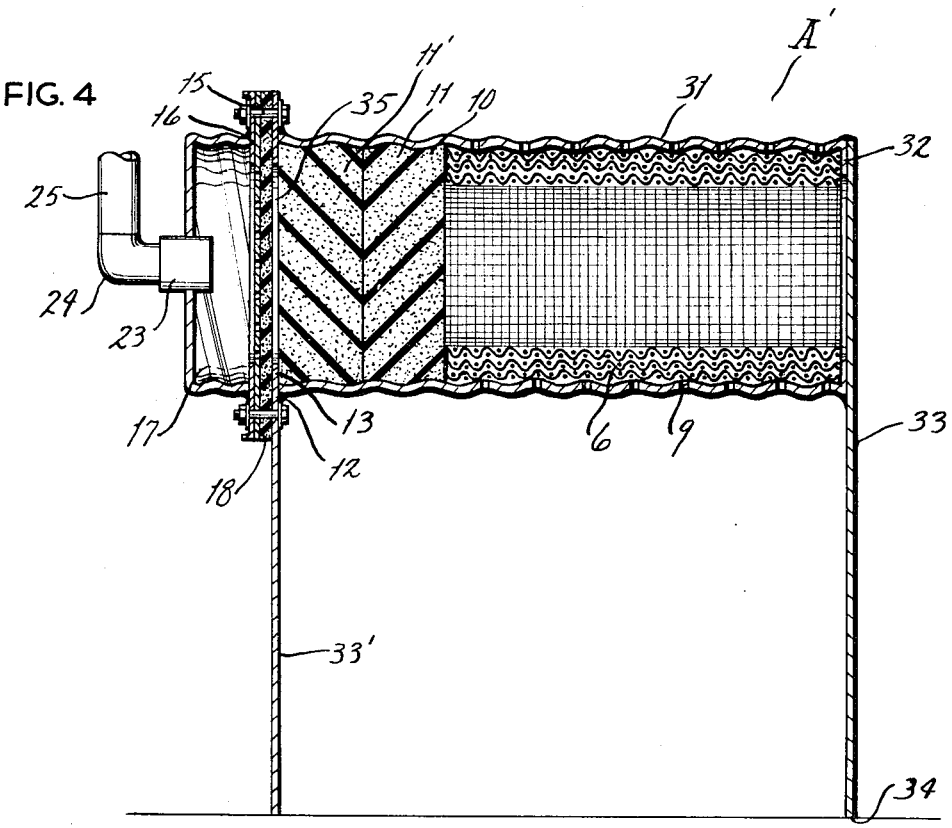
FIG. 4 is a vertical transverse sectional view taken on the line 4—4 of FIG. 3.

Referring now to FIGS. 3 and 4, A' designates another form of filter constructed in accordance with the present invention and being of the type adapted primarily for well and cistern usage. Filter A' is substantially structurally and functionally identical to filter A above described, but differs therefrom in being adapted for fixed disposition adjacent the cistern floor as opposed to being floatable within a liquid body. Portions of filters A and A' which are in correspondence are given like reference numerals for facilitating understanding and to avoid unnecessary repetition.

Filter A' comprises a casing 31 which is of general cylindrical configuration being made from aluminum or the like and having a corrugated contour. At one of its ends casing 31 is turned inwardly as at 32 to form a flange which is fixed as by welding to a support plate 33 of general triangular form having a base edge 34 for disposition upon the cistern floor and lateral converging side edges (not shown); said support plate 33 in its upper portion thus effectively closes the adjacent end of casing 31. At its end opposite flange 32 casing 31 is fixed, as by welding, to a triangular shaped support plate 33' which in all respects is similar to support plate 33 being in planar parallel relationship thereto. Plate 33 is provided with a circular opening 35 corresponding to opening 14 in filter A above described and with the portions of said plate surrounding said opening constituting outturned and inturned flanges 12,13, respectively. Provided within casing 31 toward the end adjacent support plate 33' there is presented a filter 10 consisting of a pair of spongeous blocks 11,11'. Ports 9 are located in the wall of casing 31 confronting filter element 6. It will thus be seen that casing 31 is of relatively reduced length as compared to casing 1 in that the former does not embody buoyant material nor require a reflective dome. Thus, except for the overall length casing 31 is identical to casing 1 above described. By reason of its horizontal disposition the associated receptacle 17 will be presented vertically and correspondingly, the related fitting 23 will have its major axis horizontal instead of vertical.

In view of the foregoing it will thus be seen that filter A' is adapted for fixed location within the body of water being maintained against displacement by support plates 33,33' to which it rigidly adheres. By reason of its securement filter A' does not require a floating capability and thus may incorporate a casing of relatively reduced extent.

It is to be understood that even though filter element 6 is above described as being comprised of a single continuous length of wire mesh the same may be comprehended of a multiplicity of discrete wire sections properly arranged or be replaced by any other suitably placed filtering device. Similarly, filter elements 10 and 18 are described in general terms since obviously compressible finely porous spongy agents may be used with equal facility.

Figure 5:
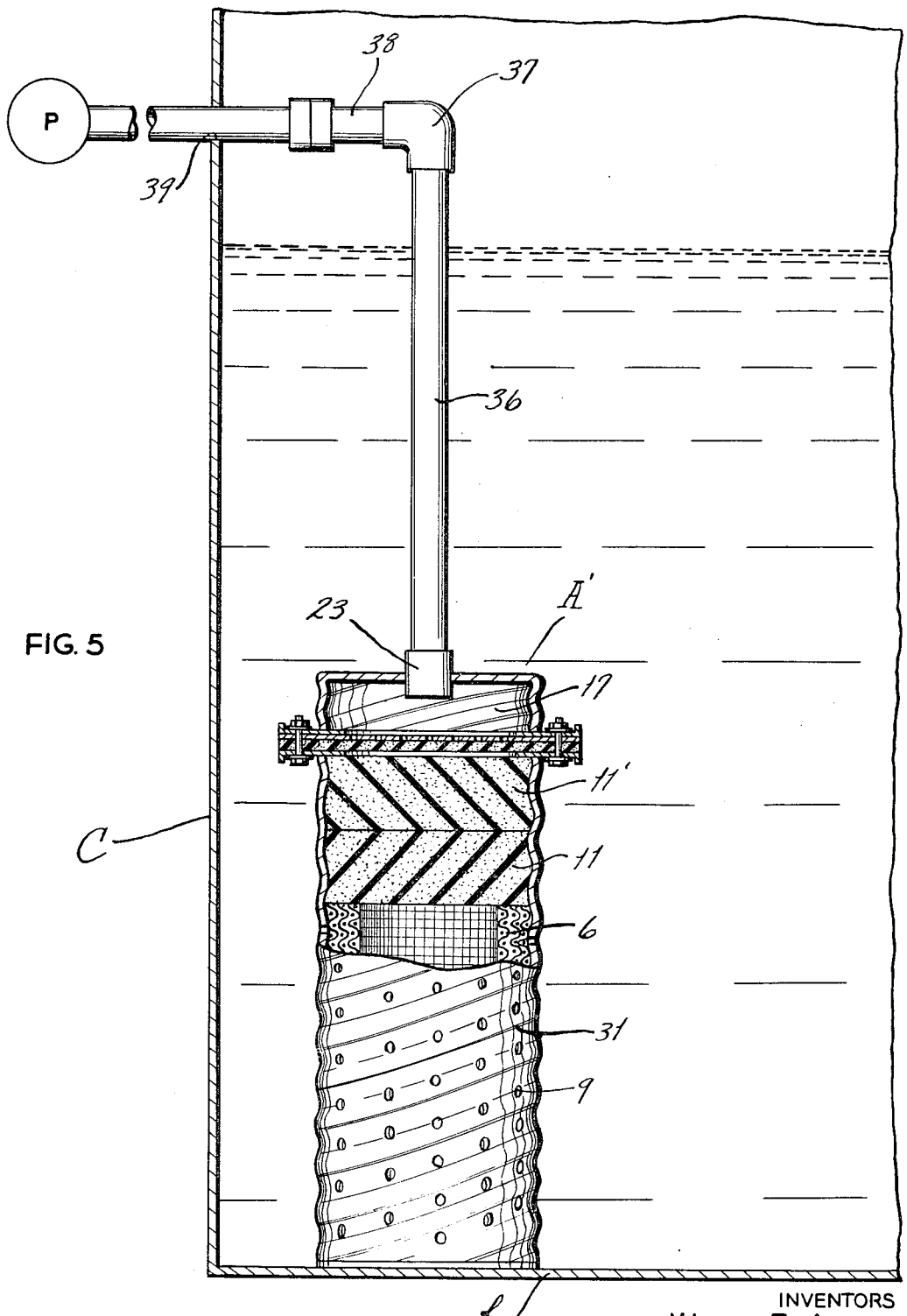
FIG. 5 is a vertical transverse sectional view of a filter constructed in accordance with the present invention illustrating same, in partial section, as presented in vertical disposition upon a cistern floor.

Referring now to FIG. 5, filter A', as above described is illustrated in operative disposition upon the floor $f$ of a cistern or well C. Filter A' is presented in vertical disposition with the end portion of casing 31 containing filter element 6 being presented downwardly so that the receptacle-carrier end of filter A' is located at the upper end thereof. In this manner of disposition, fitting 23 will be suitably connected to the lower end of riser 36 which at its upper end normally above the liquid level is connected to an elbow fitting 37, which latter is in turn engaged to the inner end of a conduit 38. Conduit 38 passes outwardly through an opening 39 in the side wall of cistern C for connection, at a remote point to a pump P. Thus, it will be observed that filter A' may be disposed vertically, as shown in FIG. 5, or horizontally as shown in FIG. 4, within a well or cistern for effective filtering operation.

Having thus described our invention, what we claim and desire to obtain Letters Patent for is:

1. For use within a body of liquid, a filter comprising means defining a casing having a chamber therein; said casing having a side wall portion about said chamber and there being a plurality of liquid inlet ports within said side wall portion, first filter means disposed within said chamber within the path of flow of liquid entering through said inlet ports, said first filter means comprising a mesh material wound upon itself into roll form and being coaxial with said casing, second filter means being of block character and of spongeous material provided at one end of said chamber and in planarwise perpendicular relationship to the axis of said first filter means, means defining a liquid collecting receptacle, means enclosing said liquid collecting receptacle coaxially of said casing on the side of said second filter means remote from said first filter means, pump means remote from said casing, conduit means connecting said liquid collecting receptacle and said pump means, third filter means presented intermediate said second filter means and said liquid collecting receptacle, and means maintaining said third filter means under compression.

2. The invention as defined in claim 1 and further characterized by said means mounting said liquid collecting receptacle comprising a base plate provided on said casing and having an opening therein, said second filter means abutting the inwardly directed face of said base plate, a companion plate fixed to the casing-adjacent portion of said liquid collecting receptacle for disposition in planarwise parallel relationship to said casing base plate, said companion plate having a plurality of perforations, said third filter means being presented between said base plate and said companion plate, and means for securing said base plate and said companion plates together with said third filter means being compressed therebetween.

3. The invention as defined in claim 1 and further characterized by buoyant means disposed in said casing at the end of said chamber remote from said second filter means, said buoyant material being of predetermined length relative to the length of said casing.

4. The invention as defined in claim 3 and further characterized by a reflector dome mounted on the exterior of said casing at the end thereof containing said buoyant material for normal presentation of said dome above the level of the body of liquid.

5. For use within a body of liquid, a filter comprising means defining a cylindrical casing having a side wall, a portion of said side wall being provided with a plurality of liquid inlet ports, a first filter disposed within said casing being coaxial therewith and being constituted of metallic mesh material wound upon itself to provide a multi-layered roll presented against the inner face of said side wall portion containing said inlet ports, said first filter centrally providing a compartment for accepting liquid filtered therethrough, means closing one end of said compartment, a second filter disposed within said casing for closing disposition across the other end of said compartment and being of block character formed from spongeous material, the main plane of said second filter being perpendicular to the axis of said first filter, a third filter presented adjacent said second filter, being planarwise parallel therewith and formed of compressible foraminous material, means maintaining said third filter in compressed condition, means defining a liquid receptacle presented adjacent said third filter for receiving liquid moving therethrough, and pump means connected to said liquid receptacle for drawing liquid through said filter.

6. The invention as defined in claim 5 and further characterized by said casing being presented within the body of liquid so that its axis is parallel to the horizontal; support means for positioning said casing within said body of liquid below the liquid surface and spacedly from the liquid body bed.

7. The invention as defined in claim 6 and further characterized by said support means comprising a pair of parallel plates of substantially triangular configuration engaged at opposite end portions of said casing and having margins for disposition upon the liquid body bed.

8. The invention as defined in claim 5 and further characterized by said filter being presented vertically within said body of water, and said means closing one end of said compartment being a body of buoyant material received within said casing.

* * * * *